United States Patent
Topart et al.

(10) Patent No.: US 12,008,145 B2
(45) Date of Patent: Jun. 11, 2024

(54) METHOD AND SERVER FOR CERTIFYING AN ELECTRONIC DOCUMENT

(71) Applicant: ORANGE, Issy-les-Moulineaux (FR)

(72) Inventors: Laurent Topart, Chatillon (FR); Philippe Legay, Chatillon (FR); Raffi Basmadjian, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 48 days.

(21) Appl. No.: 16/637,554

(22) PCT Filed: Jul. 6, 2018

(86) PCT No.: PCT/FR2018/051703
§ 371 (c)(1),
(2) Date: Feb. 7, 2020

(87) PCT Pub. No.: WO2019/030436
PCT Pub. Date: Feb. 14, 2019

(65) Prior Publication Data
US 2020/0218830 A1 Jul. 9, 2020

(30) Foreign Application Priority Data
Aug. 9, 2017 (FR) ...................................... 1757598

(51) Int. Cl.
| G06F 21/64 | (2013.01) |
| H04L 9/08 | (2006.01) |
| H04L 9/30 | (2006.01) |

(52) U.S. Cl.
CPC .............. *G06F 21/64* (2013.01); *H04L 9/088* (2013.01); *H04L 9/30* (2013.01)

(58) Field of Classification Search
CPC ............ G06F 21/64; H04L 9/088; H04L 9/30
See application file for complete search history.

(56) References Cited

U.S. PATENT DOCUMENTS 10,867,301 B2 * 12/2020 Withrow ................. G06F 21/44
2016/0300234 A1 * 10/2016 Moss-Pultz ............. G06F 21/64
(Continued)

FOREIGN PATENT DOCUMENTS

| WO | 2017004527 A1 | 1/2017 |
| WO | 2017027900 A1 | 2/2017 |

OTHER PUBLICATIONS

International Search Report dated Aug. 28, 2018 for corresponding International Application No. PCT/FR2018/051703, filed Jul. 6, 2018.
(Continued)

*Primary Examiner* — Lynn D Feild
*Assistant Examiner* — Vladimir I Gavrilenko
(74) *Attorney, Agent, or Firm* — David D. Brush; Westman, Champlin & Koehler, P.A.

(57) ABSTRACT

A method for certifying an electronic document by a certifying peer device in a network of peers storing copies of a chain of blocks according to a "blockchain". The method includes: authenticating a peer device issuing this document; generating, for the issuing peer device, a one-time use public key/private key pair; dispatching, to the issuing peer device, a message including the public key and the address of an intelligent contract in the chain; receiving a block of the chain and detecting, in this block, an event representing a writing into the intelligent contract, of an imprint of a document issued by the issuing device and a signature of this imprint; verifying the signature with the private key; dispatching a transaction to the peer devices requesting them to execute a function of the intelligent contract to record in a block of the chain information representing certification by the certifying peer device.

5 Claims, 2 Drawing Sheets

(56) References Cited

U.S. PATENT DOCUMENTS

| | | |
|---|---|---|
| 2017/0155515 A1 | 6/2017 | Androulaki et al. |
| 2018/0082256 A1* | 3/2018 | Tummuru .............. H04L 9/3297 |
| 2019/0238344 A1* | 8/2019 | Kaga ..................... H04L 9/3239 |

OTHER PUBLICATIONS

Written Opinion of the International Searching Authority dated Aug. 28, 2018 for corresponding International Application No. PCT/FR2018/051703, filed Jul. 6, 2018.

S. Nakamoto, "Bitcoin: A Peer-to-Peer Electronic Cash System", Article, Mar. 20, 2014.

English translation of the Written Opinion of the International Searching Authority dated Aug. 28, 2018 for corresponding International Application No. PCT/FR2018/051703, filed Jul. 6, 2018.

\* cited by examiner

METHOD AND SERVER FOR CERTIFYING AN ELECTRONIC DOCUMENT

CROSS-REFERENCE TO RELATED APPLICATIONS

This Application is a Section 371 National Stage Application of International Application No. PCT/FR2018/051703, filed Jul. 6, 2018, which is incorporated by reference in its entirety and published as WO 2019/030436 A1 on Feb. 14, 2019, not in English.

BACKGROUND OF THE INVENTION

The invention lies in the field of combating document fraud.

More particularly, it offers a solution for certifying a document issued by a first entity for a second entity.

The invention is applied in particular in order to combat bank fraud by offering a solution for securing the transmission of banking coordinates between a client and a supplier.

AIM AND SUMMARY OF THE INVENTION

According to a first aspect, the invention relates to a method for certifying an electronic document, this method being implemented by a peer device in a network of peers, these peer devices being configured so as to store a copy of a blockchain using a blockchain mechanism. This method is characterized in that it comprises:
- a step of authenticating a peer device that issues this document;
- a step of generating, for said issuing peer device, a single-use public key/private key pair;
- a step of sending, to the issuing peer device, a message containing said public key, the address of a smart contract in the blockchain and a description of the services offered by this smart contract;
- a step of receiving a block of said chain and of detecting, in this block, an event representative of a write operation to said smart contract, a fingerprint of a document issued by the issuing peer device and a signature of this fingerprint;
- a step of verifying the validity of said signature with said private key;
- a step of sending a transaction to the peer devices in order to ask them to execute a function of the smart contract with the effect of recording, in a block of the chain, information representative of the fact that the fingerprint of the document has been certified by said peer device.

In correlation, the invention relates to a server for certifying an electronic document, this server being a peer device in a network of peers, the peer devices of said network being configured so as to store a copy of a blockchain using a blockchain mechanism, said server being characterized in that it has:
- a unit for authenticating a peer device that issues this document;
- a unit for generating, for said issuing peer device, a single-use public key/private key pair;
- a unit for sending, to the issuing peer device, a message containing said public key, the address of a smart contract in the blockchain and a description of the services offered by this smart contract;
- a unit for receiving a block of said chain and for detecting, in this block, an event representative of a write operation to said smart contract, a fingerprint of a document issued by said issuing device and a signature of this fingerprint;
- a unit for verifying the validity of said signature with said private key;
- a unit for sending a transaction to the peer devices in order to ask them to execute a function of the smart contract with the effect of recording, in a block of the chain, information representative of the fact that the fingerprint of the document has been certified by said certification server.

It is recalled that a smart contract is an executable program stored and executed in the blockchain, such a program making it possible to store data and perform transactions in the blockchain.

Thus, and in general, the invention proposes to use a blockchain in order to guarantee both the integrity and the authenticity of a document.

To this end, the invention uses the intrinsic properties of blockchains to guarantee the integrity of the document, the fingerprint of a document not being able to be falsified in practice provided that it has been recorded in the chain.

According to the invention, the authenticity of the document is verified by a key mechanism, for example RSA keys, the proof of the authenticity of the document, in other words the proof that the fingerprint of the document has actually been recorded by an authorized user, itself being recorded in a block of the chain.

In one particular embodiment, the message sent to the issuing peer device furthermore contains the address of a decentralized application to which said issuing peer device is able to connect in order to receive an executable code in order to interact with said blockchain, executing this executable code making it possible to obtain the address of the smart contract and the description of the services offered by this smart contract.

This decentralized application may be a Dapp known to those skilled in the art. Using such a decentralized application makes it possible to improve ergonomics and to enrich the certification service according to the invention.

It is recalled that a Dapp is an application written in html/JavaScript that uses the blockchain as a back-end by calling the functions of the smart contract.

In one particular embodiment, the certification method according to the invention furthermore comprises:
- a step of receiving a fingerprint of the document from an entity that owns the document; and
- a step of verifying that said fingerprint is identical to the one recorded in the blockchain and, if this is the case, a step of executing a second function of the smart contract in order to write, to a block of said chain, information representative of the fact that said document has been validated by its owner.

The certification server according to the invention presumes that the entity that owns the document sends the fingerprint of the document only after having certified the document, in other words after having verified that the document issued by the issuing peer device does not contain any errors. For example, in the case of a bank identity statement, the owner of the document verifies, before sending the fingerprint of this statement, that the name, address and account number featuring on this statement are correct.

In one particular embodiment, the certification method according to the invention furthermore comprises:
- a step of receiving a fingerprint of a document from an entity that verifies the document; and a step of verifying that said fingerprint is identical to the one recorded in the blockchain.

The certification server is thus able to ensure:
the validity of the signature with the private key, proof that the document has actually been issued by an authorized peer;
that the document has actually been certified by its owner; and
that the document has actually been verified by the entity that verifies the document.

The invention thus allows the certification server, when it receives an indication that a document has been certified by the owner entity and/or by the verifying entity, to verify that the fingerprint of this document has actually been written to a block of the chain by an authorized peer, in other words to verify that this document has not been sent fraudulently to one or the other of these entities by a malicious third party.

The invention may apply to any type of combat against document fraud. It makes it possible in particular to combat banking coordinate fraud, for example the falsification of bank identity statements, such falsification resulting in a client not paying the account of the correct supplier, but an account corresponding to falsified coordinates.

The invention makes it possible to certify:
that it is effectively the bank that inserted the fingerprint of the document (in other words the fingerprint of the bank identity statement) into the blockchain;
that the fingerprint of this document, once it has been inserted into the blockchain, is not able to be falsified.

In one particular embodiment, the various steps of the certification method according to the invention are determined by computer program instructions.

The invention therefore also targets a computer program on an information medium, this program containing instructions designed to implement the steps of a certification method according to the invention.

This program may use any programming language and be in the form of source code, object code or intermediate code between source code and object code, such as in a partially compiled form or in any other desirable form.

The invention also targets a computer-readable information medium containing instructions of a computer program as mentioned above.

The information medium may be any entity or device capable of storing the program. For example, the medium may contain a storage means, such as a ROM, for example a CD-ROM or a microelectronic circuit ROM, or else a magnetic recording means, for example a hard disk.

The information medium may moreover be a transmissible medium such as an electrical or optical signal, which may be routed via an electrical or optical cable, by radio or by other means. The program according to the invention may in particular be downloaded from an Internet type network.

As an alternative, the information medium may be an integrated circuit into which the program is incorporated, the circuit being designed to execute or to be used in the execution of the method in question.

For more information about the concepts of blockchains, smart contracts and decentralized applications, those skilled in the art may refer to the following documents:
https://fr.wikipedia.org/wiki/Cha%C3%AEne_de_blocs
https://blockchainfrance.net/decouvrir-la-blockchain/c-est-quoi-la-blockchain/
https://github.com/ethereum/wiki/wiki/White-Paper;
S. Nakamoto "Bitcoin: A Peer-to-Peer Electronic Cash System".

BRIEF DESCRIPTION OF THE DRAWINGS

Other features and advantages of the present invention will become apparent from the description given below with reference to the appended drawings, which illustrate one exemplary embodiment thereof that is not limiting in nature. In the figures.

DETAILED DESCRIPTION OF ONE EMBODIMENT OF THE INVENTION

Figure 1:
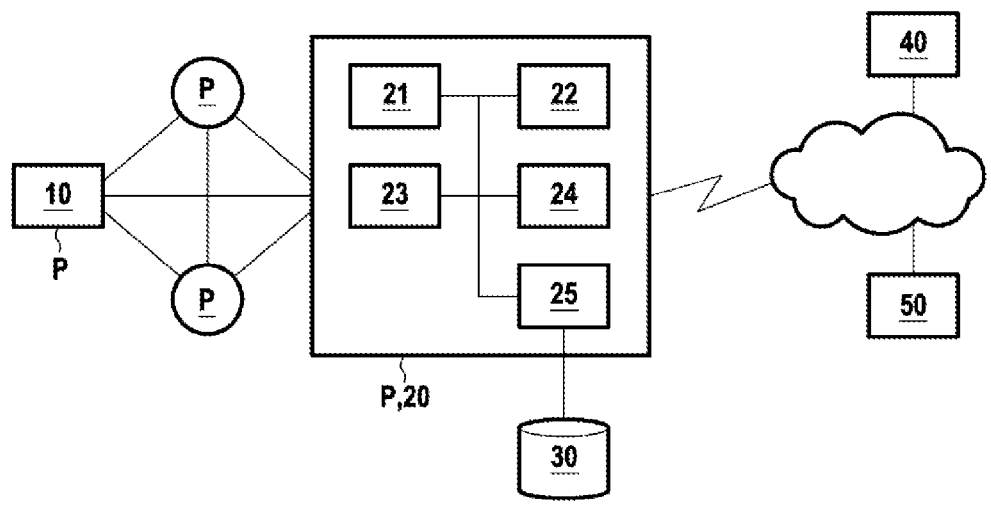
FIG. 1 shows a certification server according to one particular mode of implementation of the invention in its environment.

FIG. 1 shows a certification server 20 according to one particular embodiment of the invention in its environment.

This certification server 20 is a peer P in a network of peers P, each of these peers P being configured so as to store a copy of a blockchain in the sense of the blockchain technology.

In the exemplary embodiment described here, the blockchain that is used is a programmable blockchain for creating smart contracts and decentralized applications (Dapps), for example the Ethereum blockchain.

It is recalled that, according to the Ethereum technology, the network of peers contains two types of peer, namely:
what are known as "miner" peers that store the transactions in a block, and regularly, for example every 12 seconds, perform what is known as a mining operation consisting in executing these transactions, writing the result of these transactions to the block, calculating a fingerprint of the block (nonce) by way of a mathematical function, and broadcasting this block in the network of peers; and
simple peers that receive the generated blocks, verify the validity thereof and store a copy of the blockchain.

In the embodiment described here, the certification server 20 has the hardware architecture of a computer. It has a processor 21, a ROM read-only memory 22, a RAM random access memory 23 and communication means 24 and means 25 for accessing a database manager 30.

The ROM read-only memory 22 constitutes a recording medium in the sense of the invention. It contains a computer program according to the invention containing instructions able to implement a certification method according to the invention, the main steps E10 to E130 of which will be described with reference to FIG. 2.

The certification server 20 has
a unit for authenticating a peer device, for example from an identifier (login) and a password that are received from this peer device;
a unit for generating a single-use public key/private key pair;
a unit able to send, to a peer device of the network, a message containing a public key, the address of a smart contract in the blockchain and a description of the services offered by this smart contract (ABI for application binary interface);
a unit for receiving a block of said chain and for detecting, in this block, an event representative of a write operation to the smart contract, a fingerprint of a document and a signature of this fingerprint;

a unit for verifying the validity of a signature made with a public key using a private key associated with this public key;

a unit for sending a transaction to the peer devices in order to ask them to execute a function of the smart contract with the effect of recording, in a block of the chain, information representative of the fact that the fingerprint of a document has been certified by said certification server.

In the embodiment described here, it is assumed that the network of peers P contains a peer device 10 (for example a bank) that issues a document (for example a bank identity statement).

FIG. 1 also shows an entity 40 that owns the document (for example a supplier company whose bank account corresponds to the bank identity statement issued by the bank) and a verifying entity 50 that wishes to be able to ensure the integrity and the authenticity of the document (for example a client of the supplier company).

In the embodiment described here, the entity 40 that owns the document and the verifying entity 50 are not peers of the network of peers. They do not have access to the blockchain.

Figure 2:
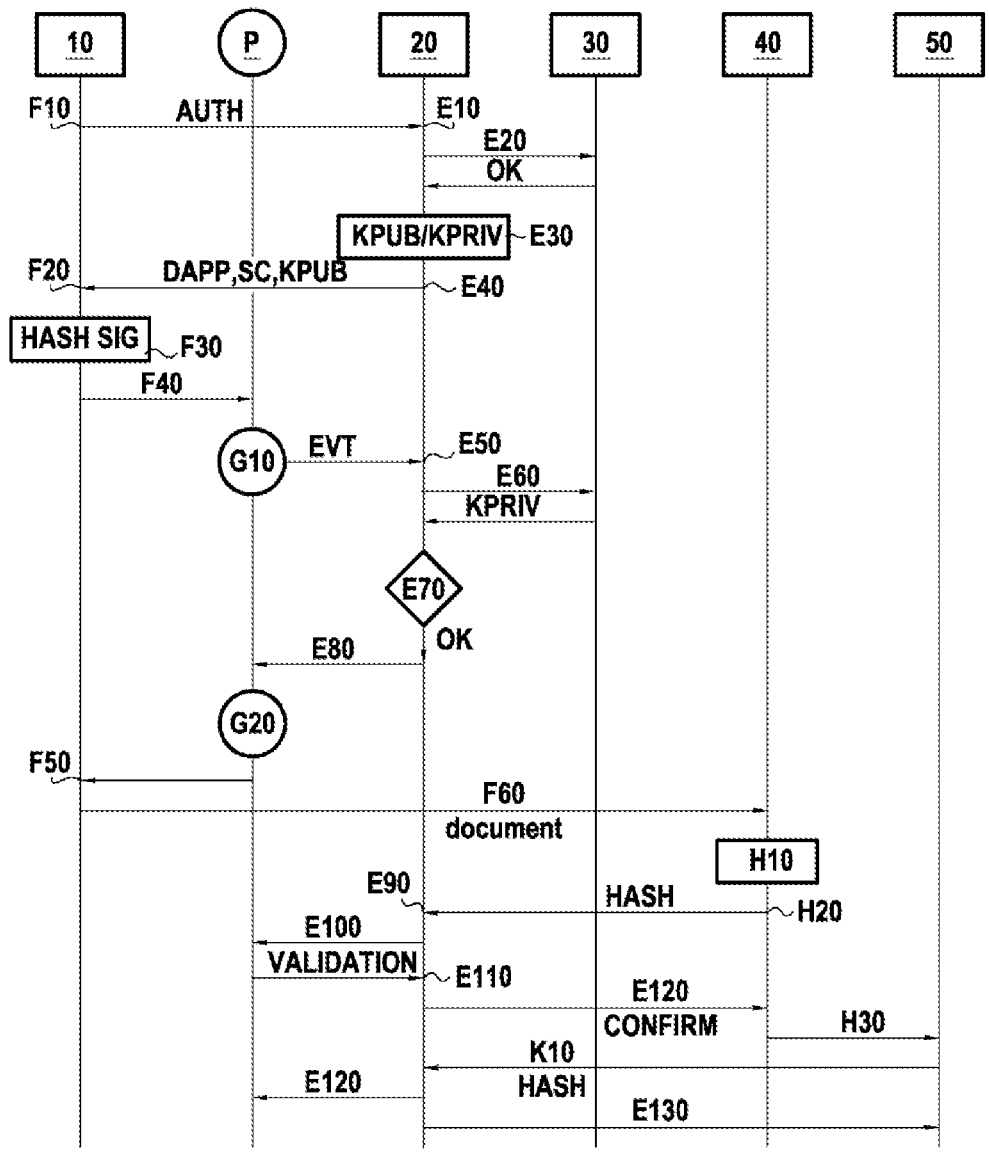
FIG. 2 shows the main steps of a certification method according to one particular embodiment of the invention, in the form of a flowchart.

FIG. 2 shows the main steps E10 to E130 of a certification method according to one particular embodiment of the invention.

The context is adopted in which the issuing peer device 10 wishes to certify an electronic document, for example a bank identity statement.

In a step F10, the issuing peer device 10 sends an authentication request to the certification server 20 according to the invention in order to authenticate itself with this server, said request containing for example an identifier and a password. The certification server 20 receives this request in a step E10.

Upon reception of this authentication request, the certification server 20, in a step E20, verifies the connection data with a database management system 30 containing certificates associated with users. It is assumed hereinafter that the connection data are valid and that the authentication of the issuing peer device 10 succeeds.

According to the invention, the certification server generates a single-use public key/private key pair (KPUB, KPRIV) for the issuing peer device 10 in a step E30. These keys are stored by the database management system 30.

In a step E40, the certification server 20 sends the issuing peer device 10 a response message to the authentication request, this message containing at least:

the address of a decentralized application DAPP to which the issuing peer device 10 is able to connect in order to receive an executable code in order to interact with the blockchain, for example a JavaScript code contained in an HTML page. Executing this executable code makes it possible to obtain the address of a smart contract SC (in the sense of the blockchain technology) in the smart blockchain and the description ABI of the services or functions offered by this contract; and the public key KPUB generated for the client device in step E30; and this response message is received by the issuing peer device 10 in a step F20.

In a step F30, the issuing peer device 10 uses the decentralized application DAPP to calculate a fingerprint HASH of the document, for example using a hash function, and to calculate a signature SIG of this fingerprint using the public key KPUB received from the certification server 20. The public key KPUB is able to be used only once.

In a step F40, the issuing peer device 10 broadcasts a request in the network of peers, this request containing the fingerprint HASH of the document, the signature SIG of this fingerprint and the address of the smart contract SC in the blockchain received in step F20. This request constitutes a transaction in the sense of the blockchain technology. It is received by the peer devices P of the network of peers.

Some miner peers perform a mining operation in the sense of the blockchain technology in a step G10.

This mining operation (step G10) consists in executing the smart contract SC in the blockchain in order to write the current fingerprint HASH of the document and the signature SIG of this fingerprint to the current block. In line with the advantages of the blockchain technology, this information (fingerprint of the document, signature of the fingerprint) becomes unfalsifiable provided that a few additional blocks have been added to the blockchain.

This operation of writing to the blockchain generates a write event EVT through the smart contract CS.

The miner device broadcasts this block to all of the peer devices of the blockchain, in accordance with the blockchain technology.

The certification server 20, as a peer of the network, receives this new block, verifies the validity thereof and detects therein, in a step E50, an event representative of the write operation to this contract.

In a step E60, the certification server 20 interrogates the database manager 30 in order to obtain the single-use private key KPRIV generated for the client device 10 in step E30. In a step E70, it verifies that the fingerprint of the document has actually been signed by the corresponding public key, in other words by the client device 10. It is assumed hereinafter that this is the case.

In a step E80, the certification server 20 sends a transaction to the peer devices P in order to ask them to execute a function of the smart contract, executing this function having the effect of recording, in a block of the chain, information representative of the fact that the fingerprint of the document has been certified by the certification server. This information may consist for example of a Boolean value.

In a step G20, some miner peers execute this transaction and attempt to validate the block. The miners that manage to do so broadcast the block to the peer devices of the blockchain.

In a step F50, the peer devices (and in particular the issuing peer device 10) receive this block and validate it.

It is recalled that, in the embodiment described here, the entity 40 that owns the document and the verifying entity 50 do not have access to the blockchain.

The certification server 20 constitutes a gateway in order that these entities are able to confirm the document or verify that the document is valid.

Once the user of the issuing peer device 10 has had confirmation that his document has been validated by the certification server 20, he sends the document, in a step F60, to the entity 40 that owns the document.

The entity 40 that owns the document (for example the supplier company) verifies that the information (its banking data) contained in the document (bank identity statement) are valid.

If this is the case, the entity 40 that owns the document calculates (step H10) a fingerprint HASH of the document, transmits it to the certification server 20, and asks this certification server 20, via the distributed application DAPP, to mark the document as validated by its owner (step H20).

The certification server 20 receives this fingerprint HASH in a step E90. It verifies that this fingerprint is identical to the one recorded in the blockchain and, if this is the case, executes (step E100) a new function of the smart contract CS of the blockchain with the effect of positioning a Boolean value at "TRUE", representative of the fact that the document has been validated by its owner.

Executing this function of the contract generates a "VALIDATION" event. When the certification server 20 detects this event (step E110), it sends a confirmation message to the owner of the document (E120).

The entity 40 that owns the document sends the document to the verifying entity 50 in a step H30.

The entity 50 that verifies the document sends a fingerprint HASH of the document to the certification server 20 in a step K10 in order to ask it to certify said document. The certification server receives this fingerprint in a step E120.

In this same step E120, the certification server 20 verifies, in the blockchain, whether the fingerprint is valid.

In the exemplary embodiment described here, the certification server 20 verifies:
  the validity of the signature with the private key KPRIV, proof that the document has actually been issued by an authorized peer;
  that the document has actually been certified by the owner entity 40, this being considered to be the case provided that a valid fingerprint has been received from this entity in step E90; and
  the fingerprint received from the verifying entity 50.

If this is the case, the certification server 20 sends a confirmation message to the entity 50 that verifies the document in a step E130.

The invention claimed is:

1. A method for certifying an electronic document, said method being implemented by a certifying peer device in a network of peer devices, said peer devices being configured so as to store a copy of a blockchain using a blockchain mechanism, said method comprising:
  authenticating an issuing peer device that issues this document;
  generating, for said issuing peer device, a single-use public key/private key pair;
  sending, to the issuing peer device, a message containing said public key and information relating to an address of a smart contract in the blockchain and a description of services offered by this smart contract, said public key being destined to be used by the issuing peer device for signing a fingerprint of the document;
  receiving a block of said chain and detecting, in this block, an event representative of a write operation to said smart contract, the fingerprint of the document issued by said issuing device and a signature of this fingerprint signed by the public key;
  verifying validity of said signature with said private key;
  sending a transaction to the peer devices in the network of peer devices in order to ask the peer devices to execute a function of the smart contract with the effect of recording, in a block of the chain, information representative of a fact that the fingerprint of the document has been certified by said certifying peer device;
  receiving a fingerprint of the document from an owner entity that owns the document; and
  verifying that said fingerprint received from the owner entity is identical to the one recorded in the blockchain and, if this is the case, executing a second function of said smart contract in order to write, to a block of said chain, information representative of the fact that said document has been validated by its owner.

2. The method for certifying an electronic document as claimed in claim 1, wherein said sending comprises sending an address of a decentralized application to which said issuing peer device is able to connect in order to receive an executable code in order to interact with said blockchain, executing this executable code making it possible to obtain said address of the smart contract and said description of the services offered by this smart contract.

3. The method for certifying an electronic document as claimed in claim 1, furthermore comprising:
  receiving a fingerprint of the document from an entity that verifies the document; and
  verifying that said fingerprint received from the entity that verifies the document is identical to the one recorded in the blockchain.

4. A server for certifying an electronic document, said server being a peer device in a network of peer devices, the peer devices of said network being configured so as to store a copy of a blockchain using a blockchain mechanism, said server comprising:
  a processor; and
  a non-transitory computer-readable medium comprising instructions stored thereon,
which when executed by the processor configure the server to perform acts comprising:
  authenticating an issuing peer device that issues this document;
  generating, for said issuing peer device, a single-use public key/private key pair;
  sending, to the issuing peer device, a message containing said public key and information relating to an address of a smart contract in the blockchain and a description of services offered by this smart contract, said public key being destined to be used by the issuing peer device for signing a fingerprint of the document;
  receiving a block of said chain and detecting, in this block, an event representative of a write operation to said smart contract, the fingerprint of the document issued by said issuing peer device and a signature of this fingerprint signed by the public key;
  verifying validity of said signature with said private key;
  sending a transaction to the peer devices in the network in order to ask the peer devices to execute a function of the smart contract with the effect of recording, in a block of the chain, information representative of a fact that the fingerprint of the document has been certified by said server;
  receiving a fingerprint of the document from an owner entity that owns the document; and
  verifying that said fingerprint received from the owner entity is identical to the one recorded in the blockchain and, if this is the case, executing a second function of said smart contract in order to write, to a block of said chain, information representative of the fact that said document has been validated by its owner.

5. A non-transitory computer readable recording medium on which a computer program is recorded, comprising instructions for executing a method for certifying an electronic document, when the instructions are executed by a certifying peer device in a network of peer devices, said peer devices being configured so as to store a copy of a blockchain using a blockchain mechanism, wherein the instructions configure the certifying peer device to perform acts comprising:
  authenticating an issuing peer device that issues this document;
  generating, for said issuing peer device, a single-use public key/private key pair;
  sending, to the issuing peer device, a message containing said public key and information relating to an address of a smart contract in the blockchain and a description of services offered by this smart contract, said public key being destined to be used by the issuing peer device for signing a fingerprint of the document;

receiving a block of said chain and detecting, in this block, an event representative of a write operation to said smart contract, the fingerprint of the document issued by said issuing device and a signature of this fingerprint signed by the public key;

verifying validity of said signature with said private key;

sending a transaction to the peer devices in the network of peer devices in order to ask the peer devices to execute a function of the smart contract with the effect of recording, in a block of the chain, information representative of a fact that the fingerprint of the document has been certified by said certifying peer device; and receiving a fingerprint of the document from an owner entity that owns the document; and verifying that said fingerprint received from the owner entity is identical to the one recorded in the blockchain and, if this is the case, executing a second function of said smart contract in order to write, to a block of said chain, information representative of the fact that said document has been validated by its owner.

* * * * *